June 4, 1929.  R. W. SYLVESTER ET AL  1,715,577
AUTOMOBILE BUMPER
Filed Aug. 9, 1928   2 Sheets-Sheet 2
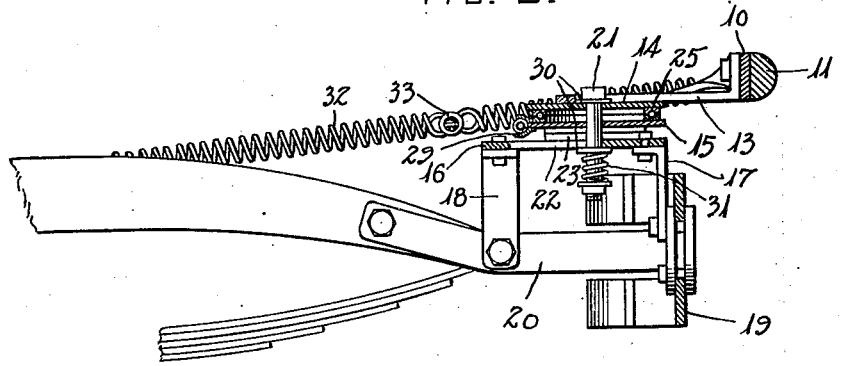
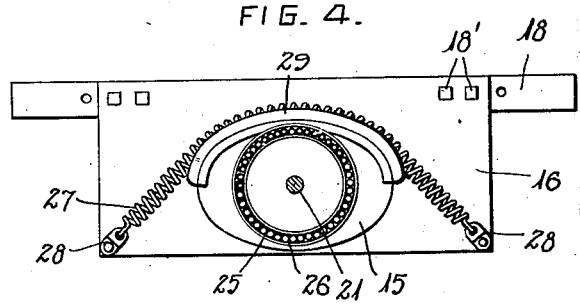
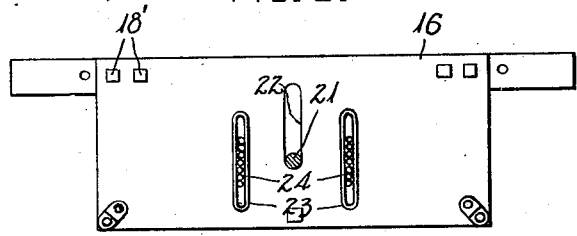
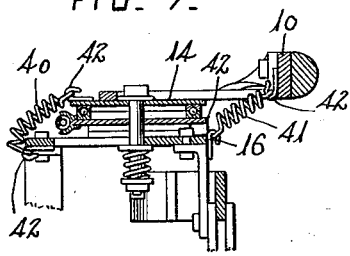
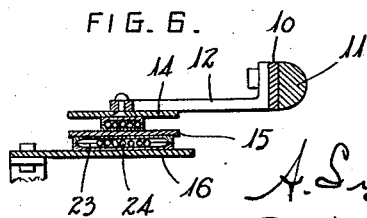
A. Sylvester
R. W. Sylvester  Inventors
By Monroe E. Miller
Attorney Patented June 4, 1929.

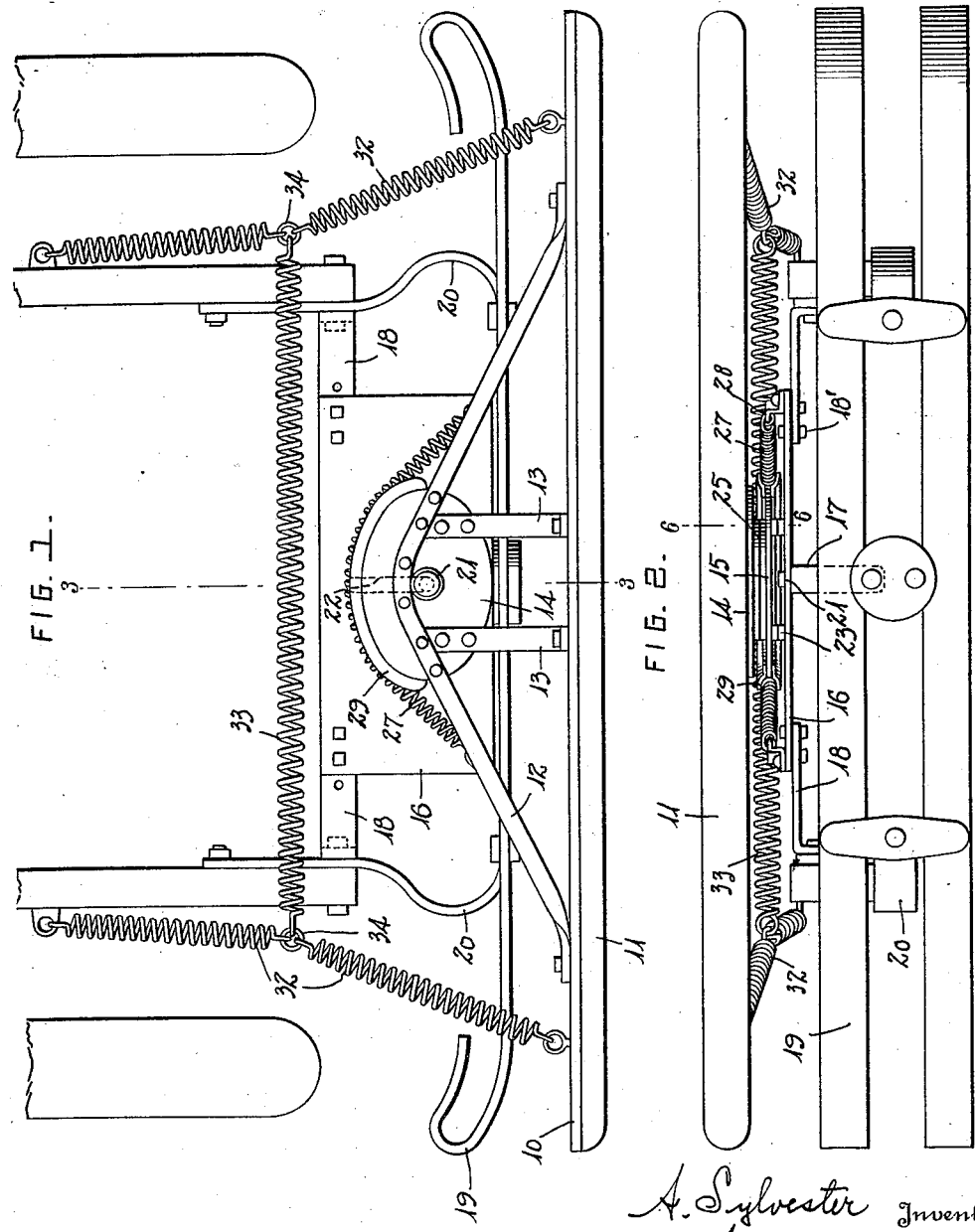

1,715,577

UNITED STATES PATENT OFFICE.

RALPH W. SYLVESTER AND AARON SYLVESTER, OF INDIANAPOLIS, INDIANA.

AUTOMOBILE BUMPER.

Application filed August 9, 1928. Serial No. 298,575.

The present invention relates to automobile bumpers, and aims to provide novel means for mounting a bumper member at the front end of an automobile for rearward yielding and swinging movements, in order to provide for a cushioning action and to provide for other benefits.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the improved device as mounted above a type of bumper already in use.

Fig. 2 is a front view thereof.

Fig. 3 is a section on the line 3—3 of Fig. 1.

Fig. 4 is a plan view of the supporting means with the bumper member and other parts removed, to show the forwardly and rearwardly slidable member.

Fig. 5 is a plan view of the supporting means with the slidable member, as seen in Fig. 4, removed.

Fig. 6 is a section on the line 6—6 of Fig. 2.

Fig. 7 is a sectional view corresponding with Fig. 3, with portions broken away, showing a modification.

The bumper, buffer or fender member may be of any suitable construction. As shown, it comprises a metal bar 10 having a cushion 11 of rubber or other resilient material on the front surface thereof.

The bar 10 is carried by brackets 12 and 13 which are secured on an oscillatory supporting plate or member 14, which is mounted on a forwardly and rearwardly slidable plate or member 15, and said member 15 is in turn mounted on a base plate 16.

The base plate 16 may be supported from the automobile frame, a front bumper of any suitable or special kind, or from the frame and bumper, and various means and devices may be employed for attachment to different automobile frames and bumpers.

In the arrangement shown, the plate 16 is supported from the bumper 19 by a bracket 17, and is supported from the automobile frame by brackets 18 which may be held by the same bolts or securing elements which fasten the brackets 20 of the bumper 19 to the frame. The brackets 17 and 18 may be of various kinds for different automobile frames and bumpers. The brackets 18 are clamped to the plate 16 by bolts 18' and have apertures for purpose of adjustment, and the plate 16 may be mounted so as to be moved out of the way should it be necessary to crank the engine of the automobile to which the device is attached.

A pivot bolt or spindle 21 extends down through the members 14, 15 and base plate 16, to mount the member 14 for oscillatory motion on the member 15, and the plate 16 has a slot 22 receiving said spindle to permit the members 14, 15 to move forwardly and rearwardly on the plate 16.

Ball races 23 are secured to the confronting surfaces of the member 15 and plate 16 at opposite sides of and parallel with the slot 22, and balls 24 work in said races to support the member 15 for free forward and rearward movement.

Annular ball races 25 are secured to the confronting surfaces of the members 14, 15 and have balls 26 working therein, to support the member 14 for free turning movement on the member 15 around the spindle 21. The member 14 thus has forward and rearward movement with the member 15 and is also free to turn, thereby enabling the bumper member to move likewise.

A coiled spring 27 has its ends anchored, as at 28, to the front corner portions of the plate 16 and extends behind the member 15, which has the flanges 29 between which the spring extends, said flanges forming a saddle for the spring. The spring 27 in contracting will normally hold the member 14 in its forward position, and said member moving rearwardly will stretch the spring. The intermediate portion of the spring seating in the saddle 29 will prevent the too free action of the spring, so as to offer frictional resistance in addition to the yielding action.

Ball bearing washers 30 are disposed on the spindle 21 and contact with the plates 14 and 16, for the free turning movement of the plate 14 and the free sliding movement of said spindle in the slot 22. A coiled spring 31 is disposed on said spindle and presses against the lower washer 30 to hold the plates 14 and 15 down. The upper washer 30 is of any suitable kind adapted for rotary motion of the plate 14, while the lower washer 30 is of any suitable kind for rectilinear movement along the slot 22. Other spring means may be employed for exerting downward pressure on the plate 14.

Coiled springs 32 are connected to the bumper bar 10 near the ends thereof and have their rear ends connected or anchored to the automobile frame, in order to maintain the bumper member in intermediate position with reference to its turning movement, and the intermediate portions of the springs 32 are connected by a transverse coiled spring 33. As shown, the springs 32 have rings 34 between their ends to which the ends of the spring 33 are connected. The spring 33 draws the intermediate portions of the springs 32 inwardly away from the front wheels of the automobile.

The improved bumper may be used by itself, or may be used in combination with any type of ordinary or specially designed bumper. As shown, the bumper member of the improved device is disposed above and in front of the ordinary bumper 19. Therefore, should the machine collide with a person, the bumper bar 10 may yield, so as to absorb the shock, and the bumper is supported at about the height of the knees so that the person struck will fall back onto the device without receiving serious injury such as might occur if the machine passed over such person.

If the bumper member contacts near either end with a person, the bumper member is swung, thereby having a tendency to ward off such person from the path of the machine. The springs 27, 32 and 33 provide for yielding action of the bumper member and will restore same to normal position when the pressure against the bumper member is removed. The slot 22 enables the bumper member 10 to move rearwardly to a position substantially flush with the bumper 19, whereby the member 10 will receive the initial shock and the bumper 19 will receive the final shock, in order that the shock may be absorbed without a sudden jar or impact. The present bumper when used by itself may also yield and swing for the same purposes as when used with another bumper.

The present bumper is intended especially to minimize injuries to human beings when struck by automobiles, but it will also be of advantage in reducing property damage when colliding with other machines or obstructions.

Fig. 7 illustrates the use of coiled springs 40 and 41 for holding the plates 14 and 15 down. There may be one or more springs 40 connecting the rear edges of the plates 14 and 16, and one or more springs 41 between the bar 10 and plate 16 or bracket 17. Hooks 42 are provided for the connection of the terminals of the springs, in order to provide for convenient attachment and detachment of the springs. The springs exert a downward pull so as to hold the plate 14 down, and the springs do not interfere with the rearward and turning movement of the parts.

All springs may be provided with suitable covers to enclose and conceal same.

Having thus described the invention, what is claimed as new is:—

1. An automobile bumper comprising supporting means, a member mounted on said means for forward and rearward and swinging movements, a bumper member connected with the firstnamed member, and spring means for moving the firstnamed member forwardly and turning said bumper member to intermediate position.

2. An automobile bumper comprising supporting means, a member mounted on said means for forward and rearward movement, a second member mounted on the firstnamed member for rotary movement, a bumper member connected with said second member, and spring means connected with the second and bumper members for turning same to intermediate position.

3. An automobile bumper comprising a base plate, a member mounted on said plate for forward and rearward movement, a second member mounted on the firstnamed member for turning movement, a spindle extending through said members and plate, the plate having a slot for the forward and rearward movement of the spindle, a bumper member connected with the second member, and spring means for moving said members forwardly and turning the bumper member to intermediate position.

4. An automobile bumper comprising a forwardly and rearwardly movable member, a bumper member pivotally connected to said firstnamed member, spring means for moving the firstnamed member forwardly and turning said bumper member to intermediate position.

5. An automobile bumper comprising a bumper member, means mounting said member between the ends thereof for forward and rearward sliding movements and for turning movement, spring means moving the intermediate portion of said bumper member forwardly, and spring means connected to the opposite terminal portions of said bumper member for turning said member to intermediate position.

6. An automobile bumper comprising supporting means, a member mounted thereon for forward and rearward sliding movement, a bumper member connected with the firstnamed member for turning movement between the ends of the bumper member, spring means for moving the firstnamed member forwardly, and coiled springs connected to the terminal portions of the bumper member for yieldingly maintaining same in an intermediate position.

In testimony whereof we hereunto affix our signatures.

RALPH W. SYLVESTER.
AARON SYLVESTER.